United States Patent
Shah et al.

(10) Patent No.: US 8,971,289 B2
(45) Date of Patent: Mar. 3, 2015

(54) MAINTAINING POINT OF PRESENCE FOR CLIENTS ROAMING WITHIN A LAYER 2 DOMAIN

(75) Inventors: Vipul Shah, Cupertino, CA (US);
Bhanu Gopalasetty, San Ramon, CA (US); Navindra Yadav, Cupertino, CA (US); Sudhir K. Jain, Fremont, CA (US); Rohit Suri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 13/068,926

(22) Filed: May 24, 2011

(65) Prior Publication Data
US 2012/0300756 A1     Nov. 29, 2012

(51) Int. Cl.
*H04W 4/00*     (2009.01)
*H04W 36/00*    (2009.01)
*H04W 36/02*    (2009.01)

(52) U.S. Cl.
CPC ..................................... *H04W 36/02* (2013.01)
USPC ........................................... 370/331; 455/436

(58) Field of Classification Search
None
See application file for complete search history.

(56) References Cited

U.S. PATENT DOCUMENTS

| | | | |
|---|---|---|---|
| 7,350,077 B2 | 3/2008 | Meier et al. | |
| 7,532,896 B2 | 5/2009 | Friday et al. | |
| 7,624,270 B2 | 11/2009 | Pathan et al. | |
| 7,706,345 B2 | 4/2010 | Meier et al. | |
| 7,844,057 B2 | 11/2010 | Meier et al. | |
| 8,218,502 B1* | 7/2012 | Liu et al. | 370/331 |
| 2007/0002833 A1* | 1/2007 | Bajic | 370/352 |
| 2008/0013474 A1* | 1/2008 | Nagarajan et al. | 370/321 |
| 2008/0304485 A1* | 12/2008 | Sinha et al. | 370/392 |
| 2009/0059930 A1* | 3/2009 | Ryan et al. | 370/395.53 |
| 2010/0290385 A1* | 11/2010 | Ankaiah et al. | 370/315 |
| 2010/0290398 A1* | 11/2010 | Choudhary et al. | 370/328 |

* cited by examiner

*Primary Examiner* — Ashley Shivers
(74) *Attorney, Agent, or Firm* — Cindy Kaplan

(57) ABSTRACT

In one embodiment, a method includes receiving a packet from a source wireless device at a second switch, the source wireless device previously associated with a first switch and roamed to and associated with the second switch, wherein a point of presence for the source wireless device is maintained at the first switch, inserting into the packet a direction indicator, and forwarding the packet from the second switch to the first switch, the direction indicator identifying the packet as being transmitted towards the point of presence for the source wireless device to prevent a forwarding loop. An apparatus is also disclosed.

20 Claims, 5 Drawing Sheets

MAINTAINING POINT OF PRESENCE FOR CLIENTS ROAMING WITHIN A LAYER 2 DOMAIN

TECHNICAL FIELD

The present disclosure relates generally to communication networks, and more particularly, to forwarding traffic for roamed clients.

BACKGROUND

Wireless is one of the many services being integrated within an access switch. A client device can connect to a wired network at the access switch by establishing a wireless connection with an access point in communication with the switch. The client device may connect to a network at one access switch and then roam to another access switch in the network. The demand for fast and seamless roaming with minimal disruption is becoming increasingly important.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
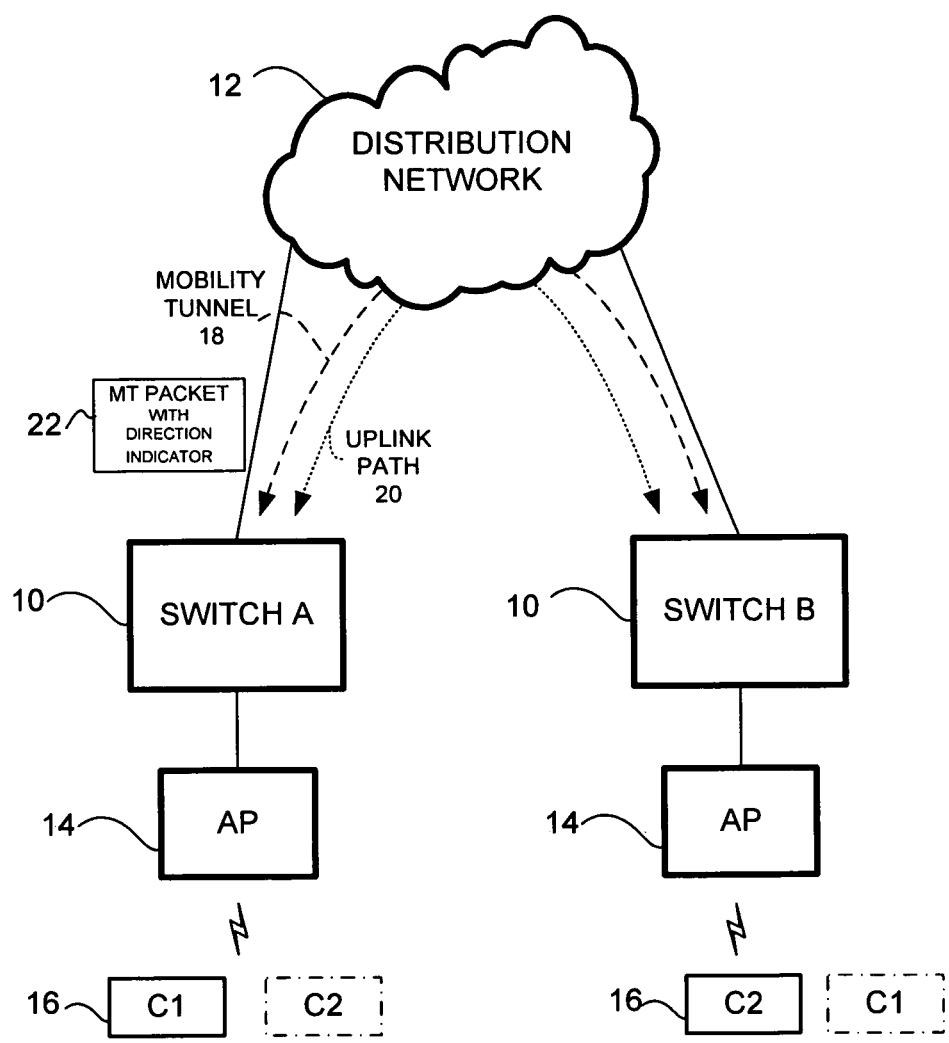
FIG. 1 illustrates an example of a network in which embodiments described herein may be implemented.

In one embodiment, a method generally comprises receiving a packet from a source wireless device at a second switch, the source wireless device previously associated with a first switch and roamed to and associated with the second switch, wherein a point of presence for the source wireless device is maintained at the first switch, inserting into the packet a direction indicator, and forwarding the packet from the second switch to the first switch, the direction indicator identifying the packet as being transmitted towards the point of presence for the source wireless device to prevent a forwarding loop.

In another embodiment, an apparatus generally comprises a processor for processing a packet received from a source wireless device at a second switch, the source wireless device previously associated with a first switch and roamed to and associated with the second switch, wherein a point of presence for the source wireless device is maintained at the first switch, inserting into the packet a direction indicator, and forwarding the packet from the second switch to the first switch, the direction indicator identifying the packet as being transmitted towards the point of presence for the source wireless device. The apparatus further comprises memory for storing a forwarding table.

In yet another embodiment, an apparatus generally comprises a processor for processing a packet received from a wireless device, associating the wireless device with the apparatus, and maintaining a point of presence for the wireless device at the apparatus after the wireless device has roamed away from the apparatus in a layer 2 roam, and memory for storing a state of the wireless device at the apparatus.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein maintain a point of presence at an access switch for a layer 2 roaming client in a distributed wireless network. As described in detail below, the point of presence is maintained at the original access switch (referred to herein as an anchor switch). In order to avoid a packet forwarding loop in the network, the traffic direction between two access switches is identified as either towards the anchor switch or from the anchor switch in a packet transmitted over a tunnel connecting the two access switches.

The embodiments operate in the context of a data communications network including multiple network devices (nodes). Some of the devices in the network may be switches, routers, gateways, servers, controllers, access points, appliances, or other network devices.

Referring now to the drawings, and first to FIG. 1, an example of a network in which embodiments described herein may be implemented is shown. The network includes switches 10 (switch A, switch B) in communication with wireless client devices (stations) 16 (C1, C2) via access points (APs) 14. The switches 10 may be, for example, access switches that provide access layer connectivity to client devices 16. The switches 10 are capable of forwarding wireless traffic. In the example shown in FIG. 1, the switches 10 communicate via a distribution network 12. The distribution network 12 may include, for example, distribution switches, core switches, mobility controllers, and other network devices.

In one embodiment, the switches 10 communicate via a tunnel (referred to herein as a mobility tunnel) 18 and uplink path 20. The mobility tunnel 18 connects the roamed client device 16 to a point of presence (access switch 10) and tunnels traffic (MT packets 22) to access switches in its mobility sub-domain. The mobility tunnel 18 and uplink path 20 may use the same interfaces at the switches 10 or different interfaces, and may use the same communication links or different communication links. The mobility tunnel 18, uplink path 20, or both mobility tunnel and uplink path may also comprise a direct communication link between the switches 10, which does not pass through the distribution network 12. As described below, communications between client devices C1 and C2 are transmitted across the mobility tunnel 18 and uplink path 20 after the client devices have roamed within a layer 2 domain.

The client device (station, wireless device) 16 may be a mobile device (e.g., phone, personal digital assistant, media device, laptop, tablet device), personal computer, or any other device that connects to and requests service from the network.

The client device 16 may have a wireless interface, wired interface, or both wireless and wired interfaces. The client device 16 associates with the access switch 10 either by a wireless network connection through access point 14 or a wired network connection (not shown). In one embodiment, the access point 14 supports the Control and Provisioning of Wireless Access Points (CAPWAP) protocol.

The wireless client device 16 may roam from one access point 14 in communication with a first access switch 10 to another access point in communication with a second access switch and thereby become attached at (or associated with) the second access switch. The client device's point of presence is the place in the network where the client device is being advertised. The point of presence stores the client device's state and policy information. For example, if the access switch 10 is advertising reachability to the client device via a routing protocol, the interface on which the route is being advertised is considered the client device's point of presence. The client device's point of attachment is where the client is currently associated to the wireless network.

When the wireless client 16 roams across switches 10 that have the client's VLAN (virtual local area network) present at both switches, it is referred to as a layer 2 (L2) roam. Moving the point of presence for L2 roamed clients from one switch to another switch may result in breaking stateful features or introduce additional complexity by transferring the client state and policy. Moving the point of presence may also add to roaming latency. These may impact the client's roaming time and features available in the network. Therefore, it is preferred to maintain the point of presence at the original access switch 10. Seamless and fast roaming is provided by maintaining the point of presence at the access switch 10 to which the client 16 initially joined (associated with) in the network (as noted above, this switch is referred to as an anchor switch). In one embodiment, the switch 10 to which the client 16 has roamed (referred to herein as a foreign switch) carries the traffic back to the anchor switch via the mobility tunnel 18.

In the example shown in FIG. 1, each client device 16 roams from one access switch 10 to another access switch by associating with an access point 14 on a different access switch. Client device C1 is originally associated with switch A and roams to switch B (as illustrated by the phantom C1 in FIG. 1). Client device C2 is originally associated with switch B and roams to switch A (as illustrated by the phantom C2 in FIG. 1). After roaming, switch A is referred to as the anchor switch for client device C1 and maintains the point of presence for C1. Switch B is referred to as the foreign switch for C1 and is the point of attachment for C1. With respect to client device C2 after roaming, switch B is the anchor switch and point of presence for C2 and switch A is the foreign switch and point of attachment for C2.

As described in detail below, packets 22 transmitted via the mobility tunnel 18 include a direction indicator to identify whether the packet is transmitted towards or away from the anchor switch 10. This prevents forwarding loops in the network for L2 roamed clients.

It is to be understood that the network shown in FIG. 1 and described herein is only an example and that the embodiments described herein may be implemented in networks having different network topologies and network devices, without departing from the scope of the embodiments.

Figure 2:
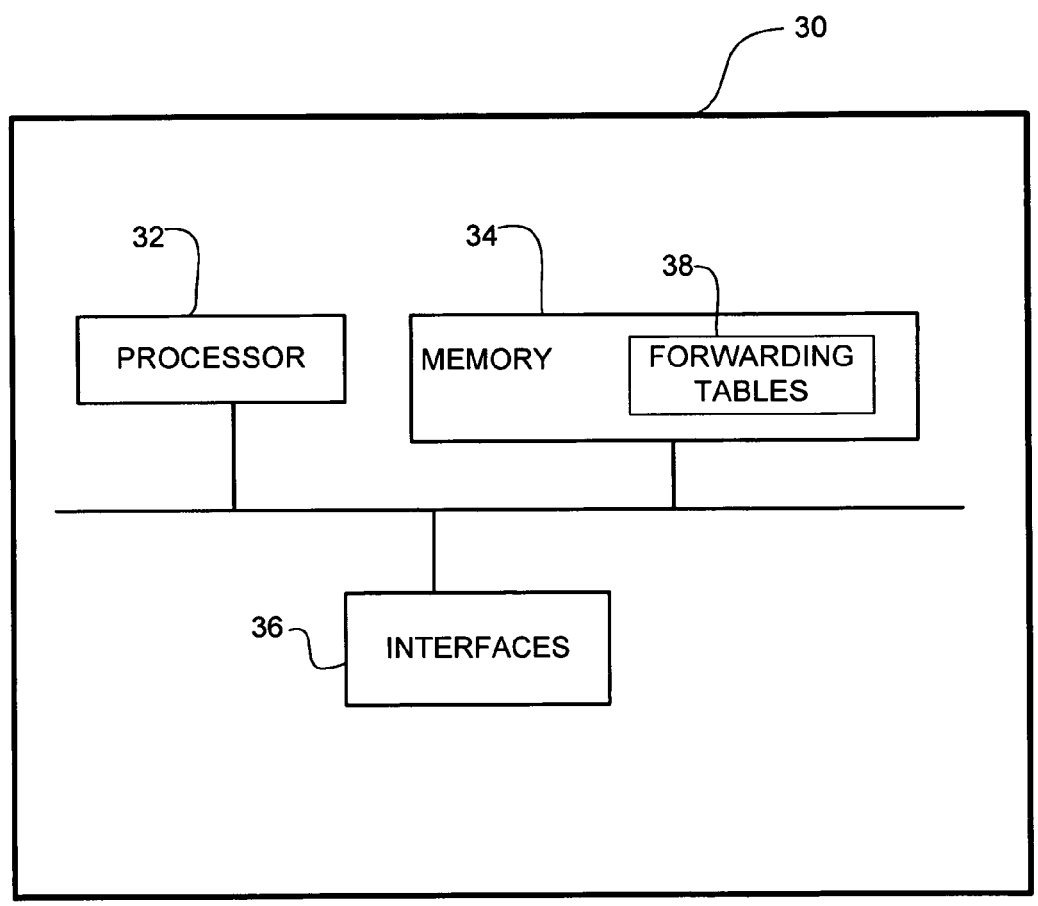
FIG. 2 depicts an example of a network device useful in implementing embodiments described herein.

An example of a network device 30 (e.g., access switch) that may be used to implement embodiments described herein is shown in FIG. 2. In one embodiment, network device 30 is a programmable machine that may be implemented in hardware, software, or any combination thereof. The device 30 includes one or more processors 32, memory 34, and network interfaces 36. Memory 34 may be a volatile memory or non-volatile storage, which stores various applications, modules, and data for execution and use by the processor 32.

Memory 34 includes one or more forwarding tables 38. In one embodiment, forwarding tables 38 comprise a client lookup, L2 source MAC address based lookup, and regular forwarding lookup. The client lookup is used for deriving client source VLAN (virtual local area network). The L2 source MAC address based lookup is used for foreign clients and forwards traffic originating from foreign clients towards the anchor switch 10 via the mobility tunnel 18. The regular forwarding lookup is used to forward traffic towards the client. It is to be understood that these are only examples and that other forwarding tables and lookups may be used without departing from the scope of the embodiments.

Logic may be encoded in one or more tangible computer readable media for execution by the processor 32. For example, the processor 32 may execute codes stored in a computer readable medium such as memory 34. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 36 may comprise one or more wired interfaces (linecards, ports) for receiving or transmitting data to other devices. The interface 36 may include, for example, an Ethernet interface for connection to a computer or network.

Figure 3:
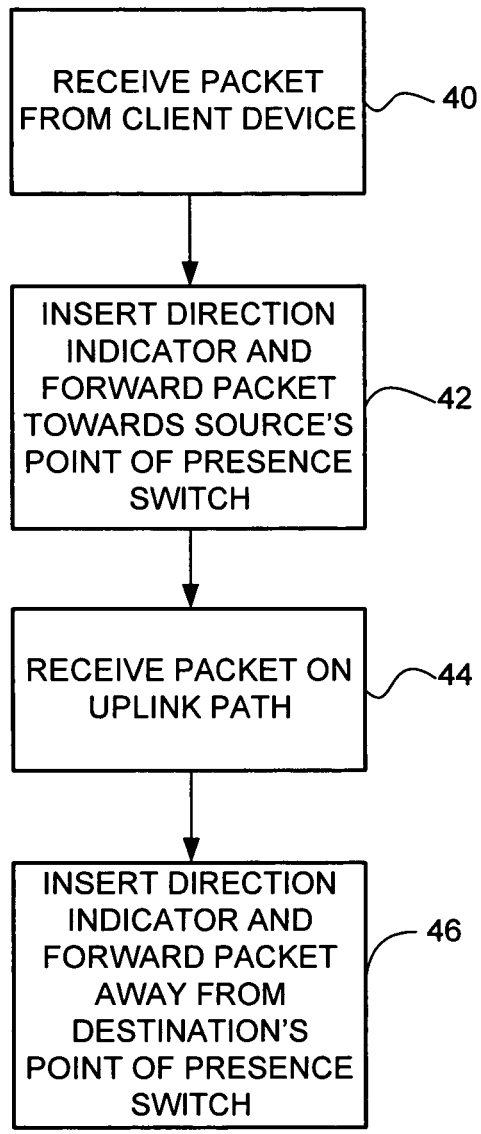
FIG. 3 is a flowchart illustrating an overview of a process for preventing forwarding loops for roamed clients in the network of FIG. 1, in accordance with one embodiment.
Figure 4:
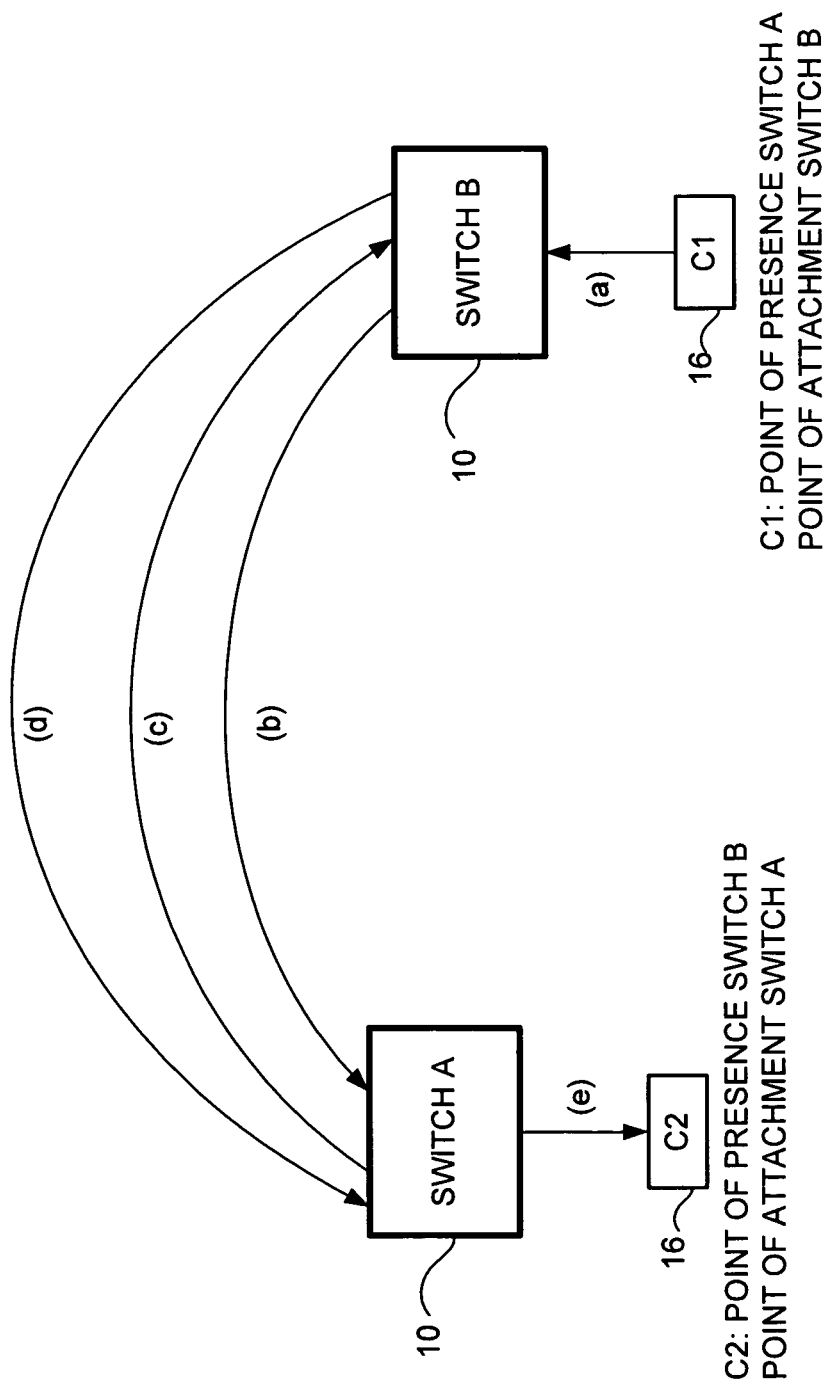
FIG. 4 illustrates an example of traffic flow between client devices in the network of FIG. 1 after the client devices have roamed.

FIG. 3 is a flowchart illustrating a process for preventing forwarding loops for roamed clients, in accordance with one embodiment. The flow of traffic for the example illustrated in the flowchart of FIG. 3 is shown in FIG. 4. FIG. 4 is a simplified schematic of the network shown in FIG. 1 after both client devices C1 and C2 have roamed. After roaming, the point of presence for C1 is at switch A (anchor switch for C1) and the point of attachment for C1 is at switch B (foreign switch for C1). The point of presence for C2 is at switch B (anchor switch for C2) and the point of attachment for C2 is at switch A (foreign switch for C2).

At step 40 in FIG. 3, a second access switch (switch B in FIG. 4) receives a packet from client device C1 (flow (a) in FIG. 4). Switch B identifies that the client device C1 is in foreign state based on a source client (IEEE 802.11 header) lookup. Traffic originating from a foreign client is forwarded towards the client's anchor switch via the mobility tunnel 18. The traffic may be sent via the mobility tunnel based, for example, on a L2 source MAC address based lookup used for foreign clients. Switch B encapsulates the packet (as described below with respect to FIG. 5), inserts a direction indicator, and forwards the packet via mobility tunnel 18 to a first switch (switch A) (step 42) (flow (b)) (FIGS. 3 and 4). The packet identifies client device C1 as the source and client device C2 as the destination. The direction indicator identifies the packet as being transmitted towards the source client device's point of presence.

Switch A receives the packet and finds the client entry for client device C1 in anchor state based on a source client lookup. Switch A applies policies and bridges the packet in a subnet shared by both client devices. The packet is forwarded via uplink path 20 to client device C2's point of presence (switch B) (step 44) (flow (c)). Switch B performs a forwarding lookup for the destination client device C2 and identifies the mobility tunnel 18 as the destination port. Switch B inserts a direction indicator and forwards the packet to the destination client device C2's point of attachment (step 46) (flow (d)). The source for this packet is client device C1 and destination is client device C2. The direction indicator identifies that the packet is transmitted away from the destination client device's point of presence. The packet is then forwarded by switch A to destination client device C2 based on a L2 (VLAN and destination MAC address) lookup (i.e., regular forwarding lookup) (flow (e)).

It is to be understood that the process illustrated in FIG. 3 and described above is only an example and that steps may be modified, added, removed, or combined, without departing from the scope of the embodiments.

Referring again to FIG. 4, the direction indicator is used to distinguish flow (b) from flow (d) for L2 roamed clients and prevent forwarding loops. The direction indicator eliminates the need to use separate mobility tunnels to distinguish the direction of traffic either from the anchor switch or towards the anchor switch. The following describes examples for placement of the direction indicator within the packet 22. It is to be understood that these are only examples and other formats, fields, tags, or indicators may be used without departing from the scope of the embodiments.

In one embodiment, the packet format used for mobility is CAPWAP with an IEEE 802.3 payload and an IEEE 802.1Q field. IEEE 802.1Q or VLAN Tagging is a networking standard which allows multiple bridged networks to transparently share the same physical network link without leakage of information between networks. IEEE 802.1Q adds a 32-bit field between the source MAC (media access control) address and payload. The 32-bit field includes a 12-bit VLAN identifier.

Figure 5:
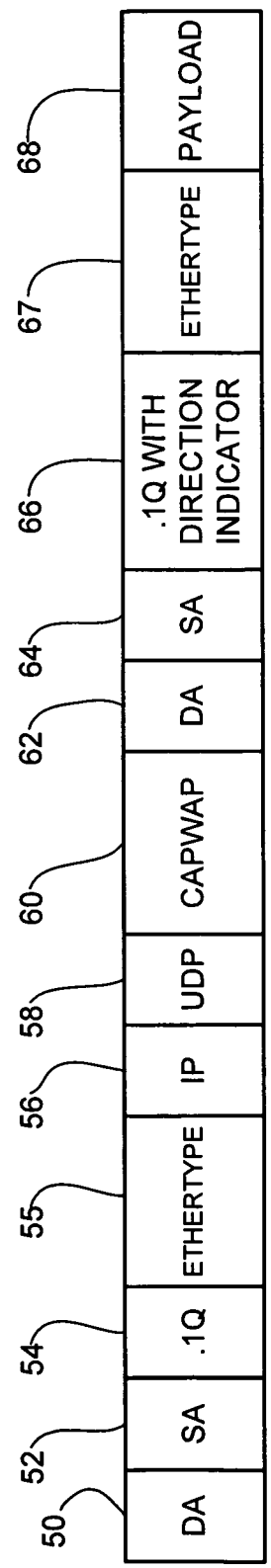
FIG. 5 illustrates an example of a format for packets transmitted over a mobility tunnel in the network of FIG. 1, in accordance with one embodiment.

FIG. 5 illustrates one example of a frame format for packet 22 on mobility tunnel 18. The packet includes an outer IEEE 802.3 header comprising a destination address field 50, a source address field 52, an 802.1Q (0.1Q) field 54, and an Ethertype field 55. These fields are followed by an IP address field (destination switch IP address) 56, UDP (user datagram protocol) port field 58, and CAPWAP field 60. Next is the inner IEEE 802.3 header comprising a destination address field 62, source address field 64, 802.1Q field with direction indicator 66, Ethertype field 67, and payload 68 (containing the payload from the client). In this example, the VLAN identifier of the 802.1Q field in the inner header is used to indicate the direction of the packet traversing on the mobility tunnel 18. The direction indicator may comprise, for example, VLAN 0 for a packet sent towards the anchor switch and VLAN VM (or VLAN 4095) for a packet sent away from the anchor switch.

In a second example, bits in the CAPWAP header 60 are used to identify if the packet is transmitted towards an anchor switch or from an anchor switch. The bits may include, for example, CAPWAP.FromAnchor and CAPWAP.ToAnchor bits. This results in changes to the CAPWAP header format and corresponding changes in the switch to parse and use these additional bits from the CAPWAP header.

In another embodiment, multiple mobility tunnels 18 are used to separate the 'foreign to anchor' traffic from the 'anchor to foreign' traffic. This embodiment eliminates the need for a direction indicator but creates multiple tunnels between access switches 10.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving a packet from a source wireless device at a second switch, the source wireless device previously associated with a first switch and roamed to and associated with said second switch, wherein a point of presence for the source wireless device is maintained at said first switch;
    identifying that the source wireless device is in a foreign state based on a source lookup;
    encapsulating the packet for transmittal on a tunnel extending between said first and second switches; and
    inserting into the packet a direction indicator and forwarding the packet from said second switch to said first switch, said direction indicator identifying the packet as being transmitted towards the point of presence for the source wireless device to prevent a forwarding loop and distinguish flow towards the point of presence for the source wireless device from flow towards a point of attachment for a destination wireless device in communication with said first switch;
    wherein the packet is destined for the destination wireless device in communication with said first switch, the destination wireless device having a point of attachment at said first switch.

2. The method of claim 1 further comprising receiving from said first switch the packet at said second switch, inserting said direction indicator identifying the packet as being transmitted away from the point of presence for the destination wireless device, and transmitting the packet to said first switch.

3. The method of claim 1 wherein said direction indicator is located within a field in an inner header of the packet.

4. The method of claim 1 wherein said direction indicator comprises a virtual local area network identifier.

5. The method of claim 1 wherein said direction indicator comprises a bit in a CAPWAP (Control and Provisioning of Wireless Access Points) header.

6. The method of claim 1 wherein the packet is forwarded via a mobility tunnel configured to connect the source client device to its point of presence.

7. The method of claim 1 wherein the source client device roamed to said second switch in a layer 2 roam.

8. The method of claim 1 wherein the source wireless device comprises a layer 2 roaming client.

9. The method of claim 1 wherein the destination wireless devices was previously associated with said second switch and roamed to and associated with said first switch, the point of presence for the destination wireless device maintained at the said second switch.

10. The method of claim 1 wherein a VLAN (Virtual Local Area Network) identifier of an IEEE 802.1Q field contains the direction indicator.

11. An apparatus comprising:
    a processor for processing a packet received from a source wireless device at a second switch, the source wireless device previously associated with a first switch and roamed to and associated with said second switch, wherein a point of presence for the source wireless device is maintained at said first switch, identifying that the source wireless device is in a foreign state based on a source lookup, encapsulating the packet for transmittal on a tunnel extending between said first and second switches, and inserting into the packet a direction indicator and forwarding the packet from said second switch to said first switch, said direction indicator identifying the packet as being transmitted towards the point of presence for the source wireless device to prevent a forwarding loop and distinguish flow towards the point of presence for the source wireless device from flow towards a point of attachment for a destination wireless device in communication with said first switch; and
memory for storing a forwarding table;
wherein the packet is destined for the destination wireless device in communication with said first switch, the destination wireless device having a point of attachment at said first switch.

12. The apparatus of claim 11 wherein said direction indicator is located within a field in an inner header of the packet.

13. The apparatus of claim 11 wherein said direction indicator comprises a virtual local area network identifier.

14. The apparatus of claim 11 wherein said direction indicator is located in an IEEE 802.1Q field in the packet.

15. The apparatus of claim 11 wherein said direction indicator comprises a bit in a CAPWAP (Control and Provisioning of Wireless Access Points) header.

16. An apparatus comprising:
a processor for processing a packet received from a wireless device, associating the wireless device with the apparatus, and maintaining a point of presence for the wireless device at the apparatus after the wireless device has roamed away from the apparatus in a layer 2 roam; and
memory for storing a state of the wireless device at the apparatus;
wherein the processor is configured for receiving a packet from the wireless device after the wireless device has roamed away from the apparatus, the packet comprising a direction indicator identifying the packet as being transmitted towards the point of presence for the wireless device; and
wherein the direction indicator distinguishes flow towards the point of presence for the wireless device from flow towards a point of attachment for a destination wireless device in communication with the apparatus.

17. The apparatus of claim 16 wherein the memory is configured for storing policies associated with the wireless device.

18. The apparatus of claim 16 wherein the processor is configured to advertise routes associated with the wireless device.

19. The apparatus of claim 16 wherein the processor is configured to process packets with a destination address of the wireless device after the wireless device has roamed.

20. The apparatus of claim 16 wherein the apparatus operates as an access switch.

* * * * *